United States Patent [19]

Fahs

[11] Patent Number: 5,132,666
[45] Date of Patent: Jul. 21, 1992

[54] VEHICLE-MOUNTED ELECTRONIC DISPLAY SYSTEM

[75] Inventor: Glenn Fahs, Binghamton, N.Y.

[73] Assignee: Travel-Ad, Inc., Binghamton, N.Y.

[21] Appl. No.: 583,408

[22] Filed: Sep. 17, 1990

[51] Int. Cl.⁵ ............................................. B60Q 1/26
[52] U.S. Cl. .................................. 340/468; 340/472; 224/329; 40/592
[58] Field of Search ................ 340/468, 472, 470–473; 40/592, 550, 606; 248/231.4; 224/329, 325, 324, 321, 309

[56] References Cited

U.S. PATENT DOCUMENTS

| | | | |
|---|---|---|---|
| 3,385,488 | 5/1968 | Bronson | 224/329 |
| 4,052,806 | 10/1977 | George | 40/592 |
| 4,574,269 | 3/1986 | Miller | 340/468 |
| 4,868,542 | 9/1989 | Thompson | 340/468 |
| 4,928,084 | 5/1990 | Reiser | 340/479 |

FOREIGN PATENT DOCUMENTS 0131211  1/1985  European Pat. Off. .

*Primary Examiner*—Jin F. Ng
*Assistant Examiner*—Dov Popovici
*Attorney, Agent, or Firm*—Salzman & Levy

[57] ABSTRACT

The invention features a system for displaying information upon a vehicle. An electronic display is connected to a processor which generates character and graphics information. A power supply is connected to the electronic display and to the processor for providing operative power thereto. A programming device is connected to the processor for providing routines, which contain different messages for the electronic display. The screen of the display is mounted on the vehicle by means of an adjustably slidable mounting bracket. The display comprises a variable information section and a fixed information section. The fixed information section is mounted to the top of the variable information section.

8 Claims, 4 Drawing Sheets

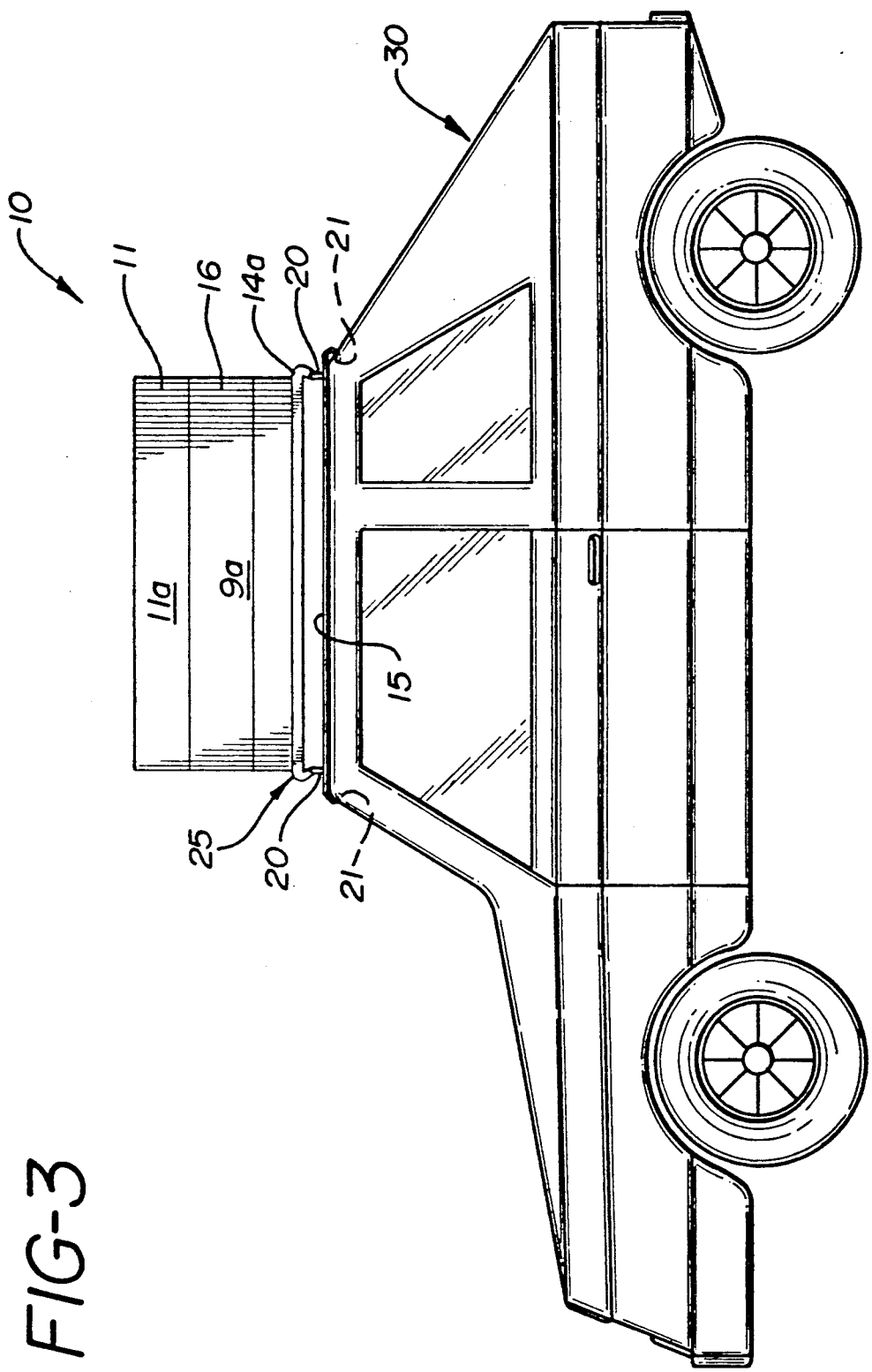

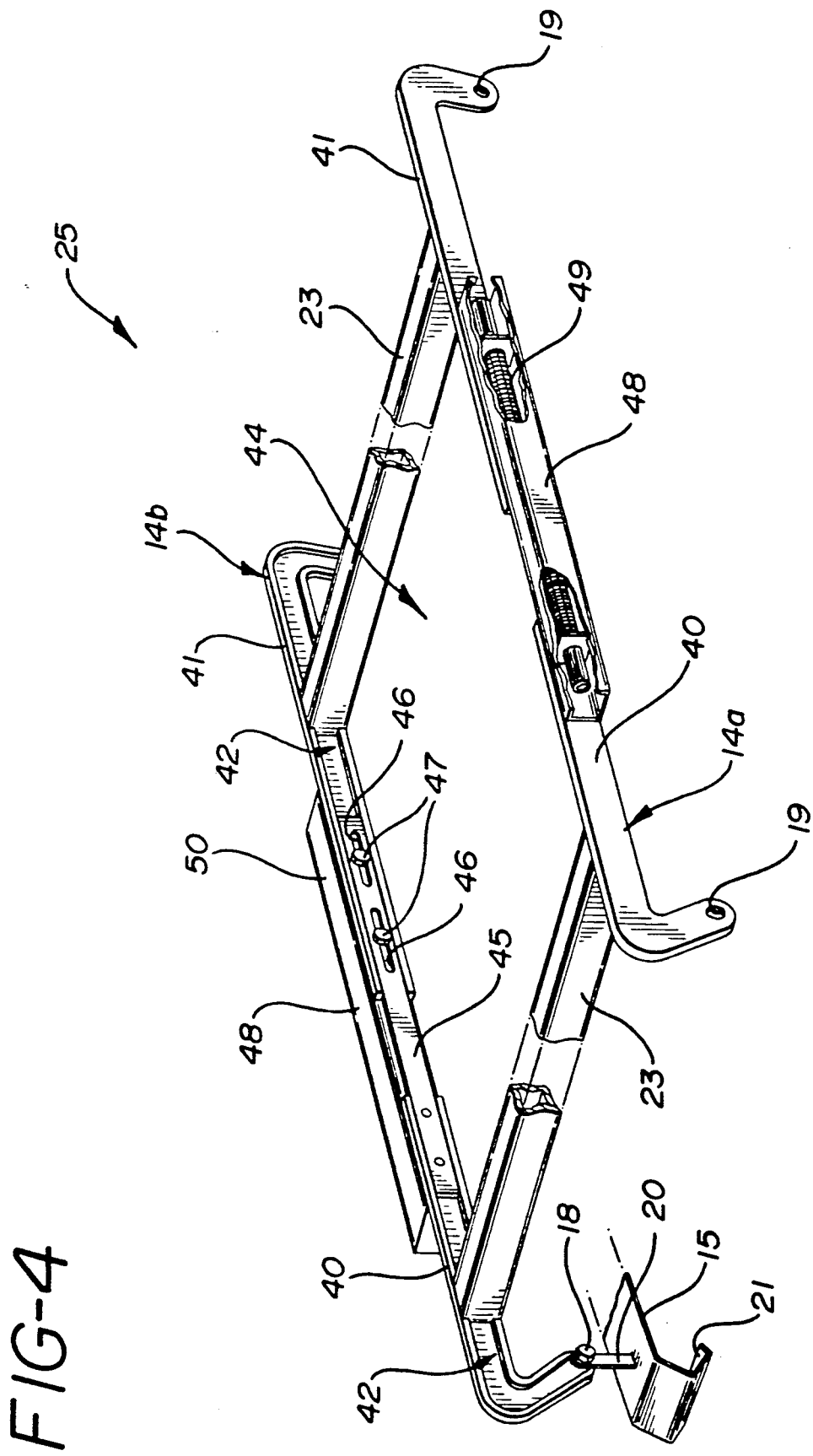

VEHICLE-MOUNTED ELECTRONIC DISPLAY SYSTEM

BACKGROUND OF THE INVENTION

The present invention relates to vehicle-mounted signs and, more particularly, to electronic display systems for use with vehicles.

European patent application no. 0 131 211 titled "Programmable Electronic Vehicular Display System," by Karlstrom et al discloses a vehicular display and radio receiver combination that obtains and displays information from a central transmission processor. The received signals include messages, advertisements, pictures, etc., which are displayed upon the vehicle by means of a matrix display panel. The panel is mounted on the roof of the vehicle so that information can be readily perceived by persons in proximity to the vehicle.

One of the drawbacks of the aforementioned system, however, is its complexity and cost. The system requires RF transmission apparatus and complex circuitry. Moreover, this display system does not permit information to be constantly displayed. That is, the message displayed is either flashed or rolled across a screen in billboard fashion.

Another drawback of the aforesaid system is that a number of vehicular displays are controlled from a central source. Should the central transmission fail, or become interrupted, all the vehicles in the fleet would be unable to display any information.

Accordingly, it would be advantageous to provide a system which is not dependent on a central source for its information, nor one that is controlled by radio frequency transmissions.

It would also be advantageous to provide a system that would allow both animated and unanimated information to be simultaneously displayed from a vehicular screen.

It would be a further advantage to have a vehicular system for displaying information that can be controlled from within the vehicle. Vehicle-controlled information is far more useful to the operator, since the driver of the vehicle can display messages of a robbery or hijack in progress, or messages requesting police or medical assistance. Such personalized information is not available from centralized transmissions. In the case of a robbery or hijack, such displayed information acts as a quiet alarm. The perpetrator of the crime is not aware that the vehicle operator is signalling for help. In the case of a medical emergency, such as when a passenger is having a cardiac arrest, the driver does not have to stop to call for assistance. A lighted or blinking message sign would also provide a more meaningful way of informing by-standers of a speeding emergency vehicle in city traffic.

Another advantage of such a display system, would be provided by a means for quickly mounting the display mechanism upon the roof of a vehicle. A quickly assembled sign would be useful for purposes of repair or replacement.

SUMMARY OF THE INVENTION

In accordance with the present invention, there is featured a system for displaying a vehicle-controlled message. An electronic display is mounted to the roof of a vehicle. The screen of the display is operatively connected to, and controlled by, a processor carried within the van, boat, truck, or automobile. The processor generates character and graphics information. A power supply operative from the car battery is connected to the electronic display and to the processor for energizing the system. A driver controlled programming device is connected to the processor for providing personalized data to the display screen. The display is mounted on the vehicle by means of an easily assembled mounting bracket and quick adjusting fasteners. Both variable information and fixed information can be simultaneously exhibited on the display. The fixed information can be removably mounted on a portion of the screen adjacent to the variable information portion. The variable information may contain animated, as well as blinking or scrolling information.

BRIEF DESCRIPTION OF THE DRAWINGS

A complete understanding of the present invention may be obtained by reference to the accompanying drawings, when taken in conjunction with the detailed description thereof and in which:

FIG. 3 depicts an in situ, side view of the display shown in FIG. 1, mounted upon the roof of an automobile; and FIG. 4 illustrates a perspective view of an adjustable bracket mechanism for use with the display of FIG. 1, for easily mounting the display to the roof of a vehicle.

DESCRIPTION OF THE PREFERRED EMBODIMENT

Generally speaking, the invention features a combination fixed and variable display with an adjustable mounting device for securing the display to the roof of a vehicle. For purposes of this description, the word "vehicle" is meant to include all commercial and passenger conveyances including, but not limited to, those that operate on land (e.g., cars, trucks, vans), by sea (e.g., boats, ships), and in the air (e.g., airplanes, helicopters, blimps).

The display is controllable by the operator of the vehicle, and can function to provide advertisements (political or otherwise), or individual messages, such as requests for assistance or the announcement of an emergency. The adjustable mounting device allows for mounting the display to different sized cabs of various vehicles. The mounting bracket also allows for quickly assembling the display upon the roof of the automobile, such that it can be easily maintained, repaired or replaced.

For the purposes of clarity and brevity, similar elements and components will have the same designation throughout the figures.

Figure 1:
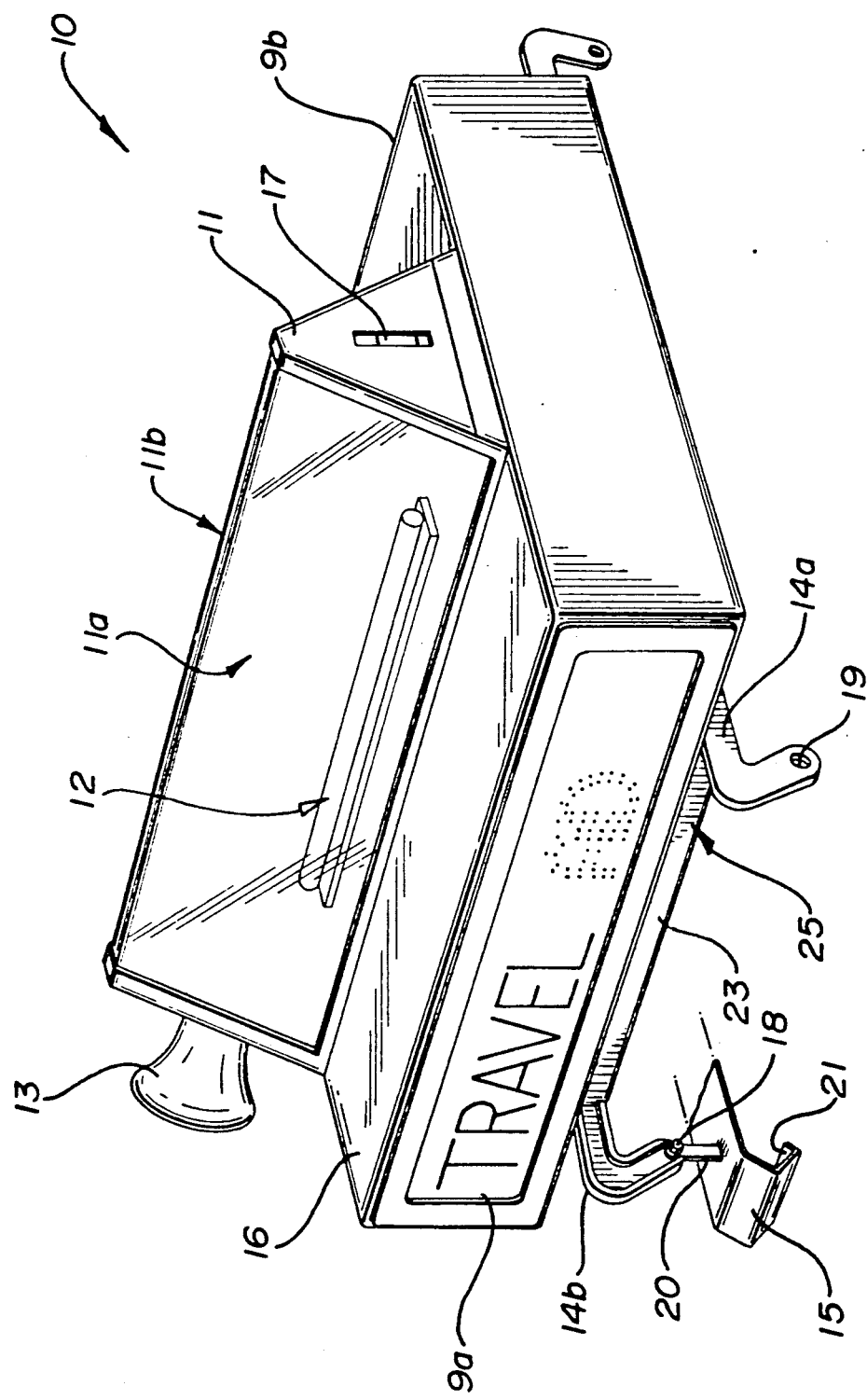
FIG. 1 illustrates a perspective view of the fixed and variable display of the invention attached to bracket mounts for securing the display to the roof of an automobile.

Now referring to FIGS. 1 and 3, the display and mounting bracket combination 10 of this invention is shown. The display 102 (FIG. 2) has two sections 11 and 16, respectively. Section 16 comprises a variable display having two electronic screens 9a and 9b. These electronic screens comprise, for example, LED units that can be electrically programmed to provide a message or advertisement, or graphic picture. The programmed message can be flashed or scrolled across the screens, or can comprise animated, action-type information.

The fixed display section 11 is mounted above the variable display 16, and comprises two screen faces 11a and 11b, respectively. The faces 11a and 11b can comprise two transparent Lexan ® panels through which a logo or other message can be shown.

A speaker 13 on the side of the fixed display section 11 can be used to convey audible messages in connection with the displays 11 and 16 A socket 17 is located on the opposite side of the display panel 11, for mounting another public announcement system or other sound emitting device. A fluorescent light 12 is mounted within the fixed display 11 in order to illuminate the display screens 11a and 11b.

The displays 11 and 16 are secured to a rectilinear, mounting deck unit, shown generally by the arrow 25 (FIG. 4). The securement of the display to this bracket will be explained in more detail hereinafter, with reference to FIG. 4.

The bracket 25 comprises two parallel side arms 14a and 14b respectively. The display section 16 rests upon, and is secured to these side arms. The side arms 14a and 14b are respectively secured by bolts 18, or wing-nuts to a flange 20 secured to a claw-type fixture arm 15, via holes 19. There are two claw-type fixture arms 15 (see FIG. 4). Each fixture arm 15 is disposed across the roof of the vehicle, and secure thereto by means of lips 21. Two cross-bars 23 form the rectilinear deck unit 25 with fixture arms 15, as shown in FIG. 4.

Referring to FIG. 3, a schematic side view of the display and bracket combination 10 of the invention shown in situ. For purposes of explanation, the display is shown mounted upon the roof of an automobile 30. However, it is to be understood that the display can be easily mounted to a boat, a van, the cab of a truck, or the top of a taxi or other livery vehicle.

Figure 2:
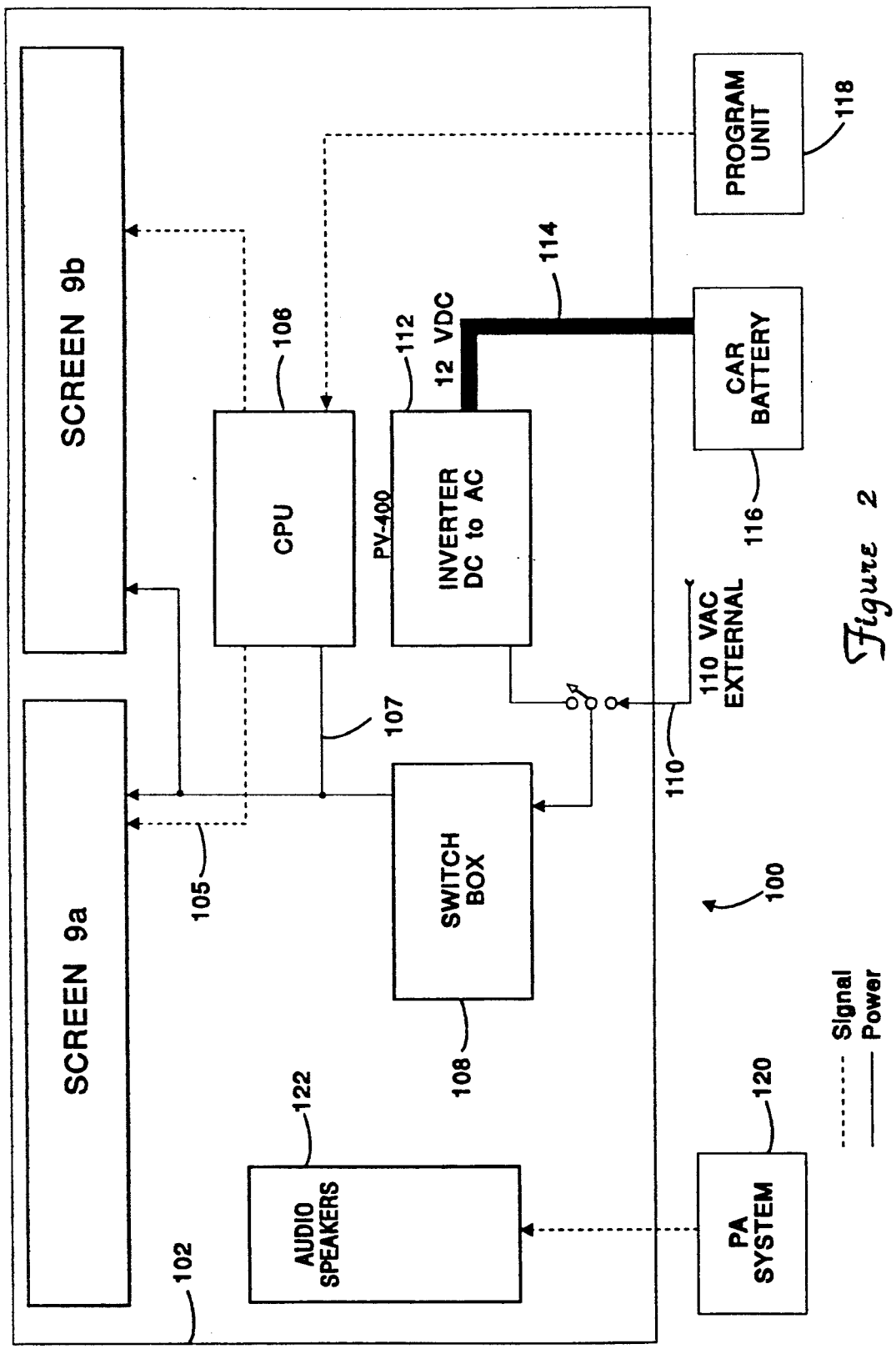
FIG. 2 shows a schematic diagram of the control circuit for the display of FIG. 1.

Referring now to FIG. 2, there is shown a block diagram of the electrical control circuit of the present invention. The entire electronic display system is shown generally at reference numeral 100. The unit that is mounted usually on the roof of a vehicle is shown generally at reference numeral 102. In the preferred embodiment, two side display screens 9b and 9d are provided, although four screens can also be used to wrap around the unit. They are light emitting diode units having a matrix of LED elements, one LED per pixel. In the preferred embodiment, a two-line screen is used with between 5 and 9 characters per line. The overall dimensions are 3 foot 10 inches by 11 inches by 3 inches in depth and require 100 watts to power the sign. The preferred unit is available from Centaure U.S.A Incorporated in Clinton, N.J., as model no. 2 TP14.

The screens are connected to a processor 106 by lines 105. The CPU 106 comprises an 8-bit microprocessor, available from Centaure.

Connected to processor 106 and to screens 9a and 9b are power lines 107. Power is provided through a switch box 108. Each screen 9a and 9b, respectively, is powered individually by means of switch box 108, as is well known in the art. CPU 106 is also individually powered by switch box 108. Switch box 108 is connected by means of line 110 to a 110 volt ac external power supply, if desired. When the vehicle is stationary, for example, power can be provided to activate screens 9a and 9b from an external power source, rather than a portable battery or vehicle battery. However, when the vehicle is in motion and it is impossible to provide power from a stationary power source, an inverter 112 is used to provide the necessary screen and CPU wattage from a vehicle battery. Invertor 112 is a dc/ac invertor such as model no. PV-400, provided by Tripp Lite Company. Invertor 112 is connected by means of power line 114 to the vehicle battery 116, as is well known in the art.

Also connected to processor 106 from a remote location is a program unit 118, such as a Videotel terminal, manufactured by Centaure U.S.A. The program unit 118 can be transported within the vehicle itself or the CPU 106 can be preprogrammed CPU 106. The operator of the vehicle 30 can summon any particular program routine, such as a message for assistance.

A public address system 120 can also be provided to control audio speakers 122, if desired. The public address system 120 is connectable to socket 17, shown in FIG. 1.

In operation, the specified power supply is selected by means of a standard plug and outlet connected to switch box 108. Thus, if the display system is stationary, the 110 volt line 110 is connected to switch box. If, however, the electronic display system is moving on the vehicle, the power input to switch box 108 is derived from invertor 112, which, in turn, is connected to the vehicle battery 116.

Invertor 112 provides 400 watts by drawing 40 amps from the vehicle battery 116.

To operate the electronic display system with an electronic message that can be scrolled, flashed, animated, etc., the program unit 118 is connected to CPU 106. Program unit 118 includes a keyboard, or a series of program selector push buttons mounted on the dashboard of the vehicle, not shown. The user enters one or more messages into the CPU 106, via said keyboard or push buttons. The system is provided with flexibility to allow the same message programmed by a program unit 118 to be displayed on either one or both of the screens 9a and 9b. Alternatively, by providing two programs running simultaneously, a multiplicity of messages may be displayed simultaneously.

PA system 120 comprises either a microphone or a cassette tape deck in the preferred embodiment to provide audio signals to speakers 122. The power to the PA system is ultimately derived from vehicle battery 116.

Referring to FIG. 4, the adjustable mounting deck 25 is shown in perspective view. The mounting deck 25 comprises two side arms 14a and 14b, respectively joined by two cross-bars 23, as illustrated. The side arms 14a and 14b each are comprised of two slidable frames 40 and 41 that have a hollow inner track 42, similar to a curtain rod. A middle mounting bar 45 connects the two frames 40 and 41. Frames 40 and 41 slide upon the middle mounting bar 45, which slidably fits within track 42. The length of the side arms 14a and 14b can be adjusted by sliding units 40 and 41 upon the middle mounting bar 45. The center mounting area denoted by arrow 44, can be adjusted to fit different display sizes via adjustment of side arms 14a and 14b. The side arms 14a and 14b, are each secured at a desired slide position by means of slots 46 disposed in middle bar 45. Securing bolts 47 runs through the slots 46 into frames 40 and 41 to secure the middle bar 45 with respect to frames 40 and 41. The bolts 47 also connect to tensioning mechanisms 48 mounted on the side arms. Tensioning mechanisms 48 each contain an adjustable coil spring 49 (shown in the partial cut-away) for changing the tension between respective frames 40 and 41 of each side arm 14a and 14b, respectively. In this manner, the display is held securely within mounting area 44. The display can also be permanently mounted to mounting deck 25 by securing bolts running through mounting holes 50 in the tensioning mechanisms 48.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A display and mounting deck combination, comprising:
    a) a rectilinear, adjustable mounting deck adapted to connect to a roof portion of a vehicle, including slidably adjustable side arms for adjusting a center mounting area of said mounting deck to fit different sizes of displays, and wherein each of said adjustable side arms further include two slidable frames having hollow track sections slidable upon a middle bar;
    b) tensioning means attached to said adjustable side arms to provide slidable adjusting tension to said adjustable side arms, said tensioning means including an adjustable tensioning spring disposed therein;
    c) a variable information display supported by said mounting deck; and
    d) a fixed information display mounted to said variable information display.

2. The display and mounting deck combination, in accordance with claim 1, wherein said fixed information display comprises illumination means for illuminating fixed information.

3. The display and mounting deck combination, in accordance with claim 1, wherein said variable information display comprises light emitting diodes.

4. The display and mounting deck combination, in accordance with claim 1, further comprising:
    d) sound generating means operatively connect to said fixed information display.

5. The display and mounting deck combination, in accordance with claim 1, further comprising securing means attached to said adjustable side arms for fixing said adjustable side arms in a set portion.

6. The display and mounting deck combination, in accordance with claim 1, wherein said middle bar comprises means defining a slot, wherein a fastener passing through said slot can permanently affix said middle bar to said frames in a desired slidable position.

7. The display and mounting deck combination, in accordance with claim 1, further comprising a pair of clawtype brackets mountable to a roof portion of a vehicle, said claw-type brackets having means for securing respective ones of said adjustable side arms thereto.

8. The display and mounting deck combination, in accordance with claim 1, further comprising dash mounted programming means under control of a driver of said vehicle, said programming means operatively connected to said variable information display for providing a selected message to said variable information display.

* * * * *